US012728527B2

(12) United States Patent
Chevron et al.

(10) Patent No.: US 12,728,527 B2
(45) Date of Patent: Sep. 8, 2026

(54) METHOD FOR ADJUSTING A GEOMETRICAL MODEL OF A MULTI-AXIS ROBOT EQUIPPED WITH A CAMERA, APPLICATION FOR A ROBOT APPLYING A COATING PRODUCT, AND ROBOT CONFIGURED TO IMPLEMENT SUCH A METHOD

(71) Applicant: EXEL INDUSTRIES, Epernay (FR)

(72) Inventors: Didier Chevron, Moirans (FR); Juan Palacio, Grenoble (FR); Nicolas Chouan, Allevard-les-bains (FR)

(73) Assignee: EXEL INDUSTRIES, Epernay (FR)

( * ) Notice: Subject to any disclaimer, the term of this patent is extended or adjusted under 35 U.S.C. 154(b) by 19 days.

(21) Appl. No.: 18/970,090

(22) Filed: Dec. 5, 2024

(65) Prior Publication Data

US 2025/0178192 A1 Jun. 5, 2025

(30) Foreign Application Priority Data

Dec. 5, 2023 (FR) ...................................... 2313582

(51) Int. Cl.
*B25J 9/16* (2006.01)
*B25J 11/00* (2006.01)

(52) U.S. Cl.
CPC ............. *B25J 9/163* (2013.01); *B25J 9/1605* (2013.01); *B25J 9/1697* (2013.01); *B25J 11/0075* (2013.01)

(58) Field of Classification Search
CPC ........ B25J 9/163; B25J 9/1605; B25J 9/1697; B25J 11/0075; B25J 9/1692; B25J 13/08;
(Continued)

(56) References Cited

U.S. PATENT DOCUMENTS 6,321,137 B1 * 11/2001 De Smet ................ B25J 9/1692 700/263
9,188,973 B2 * 11/2015 Tenney .................. H04N 7/181
(Continued)

FOREIGN PATENT DOCUMENTS

CN 109483516 B 6/2020
CN 115431278 A 12/2022
(Continued)

OTHER PUBLICATIONS

Mooring et al., "Fundamentals of manipulator calibration", Dec. 1991, 342 pages.

(Continued)

*Primary Examiner* — Masud Ahmed

(74) *Attorney, Agent, or Firm* — Thompson Coburn LLP; Steven M. Ritchey

(57) ABSTRACT

A geometrical model of a multi-axis robot equipped with a camera (30) comprises a first change matrix ($T^{Camera \to PG}$) and a second change matrix $T^{PG \to BF}$)). A method for adjusting the model comprises: aiming (1004), with the camera arranged in a first location (k1), at at least two points among L points of the target; determining the coordinates $$\left(V_{k1,l}^{Camera}\right)$$

(Continued)

of each point aimed at; moving (1005) the camera; d) aiming (1006), with the camera arranged in a second location (k2), at the same points ($P_\iota$); determining the coordinates $$\left(V_{k2,l}^{Camera}\right)$$

of each point aimed at; calculating (1008), for each point aimed at, a difference of the difference ($v^{k1,k2,\iota}$) between the coordinates nt in a base coordinate frame (BF), expressed in using the first and second change matrix $$\left(T^{Camera\to PG}, T_k^{PG\to BF}\right);$$

calculating (1010, 1018) an overall difference value (F, G). Variables ($X_1$-$X_6$, $\Delta\alpha_i$, $\Delta\iota_i$, $\Delta\theta_i$, $\Delta r_i$) of coefficients of the first and second change matrices ($T^{Camera\to PG}$, $T^{PG\to BF}$) are determined by minimizing (1012, 1018; 1021) the overall value calculated during step g). The camera is successively brought into K locations. The product of the number (L) of points of the target by the number (K) of locations minus 6 (L*K−6) is greater than or equal to the number of variables of the geometrical model of the multi-axis robot.

13 Claims, 5 Drawing Sheets

(58) Field of Classification Search
CPC ........... G05B 2219/39024; G05B 2219/39045; G05B 2219/39057; G05B 2219/40613
See application file for complete search history.

(56) References Cited

U.S. PATENT DOCUMENTS

| | | | | |
|---|---|---|---|---|
| 12,576,540 | B2 * | 3/2026 | Wakabayashi | B25J 13/085 |
| 2015/0297177 | A1 * | 10/2015 | Boctor | A61B 34/30 901/47 |
| 2019/0015991 | A1 | 1/2019 | Liu et al. | |
| 2020/0198145 | A1 * | 6/2020 | Hsu | B25J 9/1697 |
| 2020/0311956 | A1 * | 10/2020 | Choi | G06V 10/454 |
| 2022/0080597 | A1 * | 3/2022 | Huang | B25J 9/1692 |
| 2022/0258352 | A1 | 8/2022 | He et al. | |

FOREIGN PATENT DOCUMENTS

| | | | | |
|---|---|---|---|---|
| CN | 115533893 | A | 12/2022 | |
| CN | 115741720 | A | 3/2023 | |
| CN | 117021087 | A * | 11/2023 | B25J 9/1664 |
| DE | 102016204123 | A1 | 10/2016 | |
| EP | 4159386 | A1 | 4/2023 | |
| FR | 3061076 | A1 | 6/2018 | |

OTHER PUBLICATIONS

Park, "Machine-vision assisted 3D printing", Sep. 2016, 72 pages, URL:https://dspace.mit.edu/handle/1721.1/113162.

Puskorius et al., "Global Calibration of a Robot/Vision System", Proceedings 1987 IEEE International Conference on Robotics adn Automation, 1987, pp. 190-195, vol. 1.

Waldron et al., "Kinematics", Springer Handbook of Robotics, Dec. 2016, pp. 11-35.

Zhang et al., "An accurate hand-eye calibration algorithm with global optimization", Proceedings of SPIE, Jul. 2018, 6 pages, vol. 10827.

* cited by examiner

METHOD FOR ADJUSTING A GEOMETRICAL MODEL OF A MULTI-AXIS ROBOT EQUIPPED WITH A CAMERA, APPLICATION FOR A ROBOT APPLYING A COATING PRODUCT, AND ROBOT CONFIGURED TO IMPLEMENT SUCH A METHOD

CROSS-REFERENCE TO RELATED APPLICATIONS

This application claims the benefit of FR 2313582, filed on Dec. 5, 2023, which is incorporated herein by reference in its entirety.

FIELD OF INVENTION

The present invention relates to a method of adjusting a geometrical model of a multi-axis robot arranged in a room and equipped with a camera.

BACKGROUND

In the field of application of coating products by means of a multi-axis robot equipped with an application member, such as a print head, it is important to be able to accurately control the operation of the application member, in particular by taking into account the positioning of the application member relative to a surface to be coated. To this end, it is known to equip a multi-axis robot with a camera which makes it possible to identify the environment of the robot, in particular a surface to be coated, opposite which the application member has to be positioned.

To date, the position of the camera in the room, i.e. the position and/or orientation of a coordinate frame linked to the camera in a coordinate frame linked to the room wherein the robot is placed, is defined in a relatively inaccurate way.

Indeed, if a geometrical model of the robot is used, based on the assumption that the connection between the camera and the wrist of the robot is known and rigid and that the axes of the multi-axis robot, which are generally six, work perfectly, then the model used does not correspond to the physical reality of the robot equipped with the camera, because there are tolerances of mounting the camera on the wrist of the robot, because the position of the camera may have changed and because the robot as such is not perfect.

Similar problems arise with robots equipped with a camera and a tool that may be different from a member for applying a coating product.

In the field of surgery, it is known from CN115431278A to calibrate the position of the tool center (or "tool center point"—TCP) of a coordinate frame linked to a camera mounted on a multi-axis robot on the assumption that the robot is perfect. While such an approach can be considered in the case of a surgical robot, the approach cannot be transposed to an industrial robot, such as a coating product application robot, operating in a potentially disturbed and high-speed environment, to the point that the environment may not correspond to the theoretical model in terms of geometry, kinematics and/or dynamics.

It is also known from CN115533893A to determine the TCP of a camera by imposing on a robot to touch, by means of a tip, a profile in the form of a sphere. The implementation of such a method is complex and time consuming.

On the other hand, EP1555508A1 teaches how to use a measurement system by taking photographs of an object, while rotating a camera around an axis of the coordinate frame thereof, which reduces measurement errors. The method is also complex and time consuming.

CN115741720A also teaches calibrating the angular position of a sensor using computations based on the Levenberg-Marquardt method. The calibration thereby carried out is limited to the optimization of the point of origin of the angular measurement of the sensors and also makes the assumption that the robot used is perfect.

In addition, US2019/015991A1 teaches how to determine cost functions in a method for calibrating a vision device, on the basis of distances between observed features and mapped features, which is based in particular on a computation of the mapped features. This computation is envisaged in a two-dimensional model. Any inaccuracy in this computation can call into question the reliability of the calibration, and its application in three dimensions is complex.

It is such drawbacks that the invention aims more particularly to remedy by proposing anew method of adjusting a geometrical model of a multi-axis robot, taking into account the reality of the assembly between the camera and the wrist of the robot and the reality of the structure of the multi-axis robot, with a reliable approach which does not depend on the computation of mapped features.

SUMMARY OF THE INVENTION

To this end, the invention relates to a method for adjusting a geometrical model of a multi-axis robot arranged in a room and equipped with a camera, the model comprising a first matrix, for changing between a coordinate frame linked to the camera and a coordinate frame linked to a wrist of the robot, and a second matrix for changing between the coordinate frame linked to the wrist of the robot and a base coordinate frame linked to the room, the method comprising at least the following steps consisting in:

a) aiming, with the camera arranged in a first image taking location in the room, at least two points, among L remarkable points of a fixed target in the base coordinate frame, with L an integer number greater than or equal to 2;

b) determining the coordinates of each point referred to during step a) in the coordinate frame of the camera which is in the first image taking location;

c) moving the camera to a second image taking location in the room that is different from the first image taking location.

d) aiming, with the camera in the second image taking location, at the points of the fixed target, already aimed at during step a);

e) determining the coordinates of each point aimed at during step d) in the coordinate frame linked to the camera that is in the second position;

the camera being successively moved in K locations, with K an integer number greater than or equal to 2.

The method further includes at least the following steps consisting in f) calculating, for each point aimed at by the camera during steps a) and d), a difference between the coordinates of that point in the base coordinate frame, expressed in terms of the coordinates determined during steps b) and e) using the first and second change matrices;

g) calculating at least one overall difference value by means of a function having as a variable a difference calculated during step f);

In addition, coefficient variables of the first change matrix and coefficient variables of the second change matrix are determined by minimizing the overall value calculated during step g). Finally, the product of the integer numbers L and K minus 6 (L*K−6) is greater than or equal to the number of variables of the geometrical model of the multi-axis robot.

By means of the invention, the determination of the variables of the coefficients of the first matrix and the variables of the coefficients of the second matrix lead to an efficient adaptation of the geometrical model of the multi-axis robot, including with regard to the camera mounted on the wrist of the robot. The computation of the variables of the coefficients of the first matrix and of the second matrix makes it possible to take into account not only the assembly between the camera and the wrist of the robot but also the geometrical dimensioning of the robot as such, in particular due to an optimization of the modified Denavit-Hartenberg parameters. Moreover, the relationship between the integer numbers L and K, on the one end, and the number of variables of the geometrical model of the multi-axis robot ensures a sufficient number of equations for the computation to be satisfactorily efficient. No computation of a mapped feature has to be carried out, so that any inaccuracy in such a computation of a mapped feature does not call into question the overall reliability of the method.

According to advantageous but non-mandatory aspects of the invention, such a method can incorporate one or a plurality of the following features, taken individually or according to any technically permissible combination:

A first overall difference value is calculated during step g) and in that the method comprises steps subsequent to step g) and consisting in:

- h) determining the variables of the coefficients of the first change matrix by minimizing the first overall value calculated during step g);
- i) updating the first change matrix with coefficients that integrate the variables determined during step h)
- j) calculating, for each point aimed at by the camera during steps a) and d), a difference between the coordinates of the point in the base coordinate frame, expressed in terms of the coordinates determined during steps b) and e), using the first change matrix updated during step i);
- k) calculating a second overall difference value using a function with the differences calculated during step i) as a variable;
- l) determining the variables of the coefficients of the second change matrix by minimizing the second overall value calculated during step j); and
- m) updating the second change matrix with coefficients that integrate the variables determined during step i).

The method comprises a step h') subsequent to step g) and consisting in determining the variables of the coefficients of the first matrix and the variables of the coefficients of the second matrix determined, by minimizing a single overall value calculated during step g).

The method comprises steps, subsequent to step h) or step h'), consisting in:

- n) calculating, for each point aimed at by the camera during steps a) and d), a difference between the coordinates of said point in the base coordinate frame, expressed as a function of the coordinates determined during steps b) and e) using the first change matrix updated with the last coefficient variables determined for the first matrix and the second change matrix updated with the last coefficient variables determined for the second matrix.
- p) calculating an overall difference value using a function with the differences calculated during step n) as a variable;
- p) comparing the overall value calculated during step o) to a threshold value;
- q) if the comparison during step p) shows that the overall value calculated during step o) is greater than the threshold value, again using steps f) and following;
- r) if the comparison during step p) shows that the overall value calculated during step o) is less than the threshold value, freezing the first and second change matrices with the last determined variables for using same in the geometrical model of the multi-axis robot.

The difference calculated during step f), j) or n) is expressed in the form where $$v^{k1,k2,l} = T_{k1}^{PG\to BF} \cdot T^{Caméra\to PG} \cdot V_{k1,l}^{Camera} - T_{k2}^{PG\to BF} \cdot T^{Camera\to PG} \cdot V_{k2,l}^{Camera}$$

$v^{k1,k2,\imath}$ is the difference between the coordinates of the same point numbered ı seen by the camera from the positions k1 and k2;

$$V_{k1,l}^{Camera}$$

is a vector representing the position of the point l seen by the camera from the position k1;

$$V_{k2,l}^{Camera}$$

is a vector representing the position of the point l seen by the camera from the position k2;

$T^{Camera\to PG}$ is the first change matrix;

$$T_{k1}^{PG\to BF} \text{ or } T_{k2}^{PG\to BF}$$

is the second change matrix.

The overall difference value calculated during step g), k) or o) is the sum of the squares of the difference values calculated during step f), i) or l) and is expressed as where $$F = \sum_{l=1}^{L} \sum_{k1=1}^{K} \sum_{k2=k1+1}^{K} \left\| v^{k1,k2,l} \right\|^2$$

$v^{k1,k2,\imath}$ is the difference between the coordinates of the same point numbered l seen by the camera from the locations k1 and k2;

l is the order number of one of the points aimed at by the camera during steps a) and d), comprised between 1 and L k1 is the order number of the first location, comprised between 1 and K;

k2 is the serial number of the second location, comprised between 1 and K;

K is the number of locations the camera can take to aim at the points of the target.

The first change matrix is expressed in the form $$\begin{bmatrix} \cos(X_5)\cdot\cos(X_6) & \sin(X_4)\cdot\sin(X_5)\cdot\cos(X_6) - \cos(X_4)\cdot\sin(X_6) & \cos(X_4)\cdot\sin(X_5)\cdot\cos(X_6) + \sin(X_4)\cdot\sin(X_6) & X_1 \\ \cos(X_5)\cdot\sin(X_6) & \sin(X_4)\cdot\sin(X_5)\cdot\sin(X_6) + \cos(X_4)\cdot\cos(X_6) & \cos(X_4)\cdot\sin(X_5)\cdot\sin(X_6) - \sin(X_4)\cdot\cos(X_6) & X_2 \\ -\sin(X_5) & \sin(X_4)\cdot\cos(X_5) & \cos(X_4)\cdot\cos(X_5) & X_3 \\ 0 & 0 & 0 & 1 \end{bmatrix}$$

where the quantities Xi, for natural number i between 1 and 6, are the variables determined by minimizing the overall value calculated during step g) and correspond for natural number l between 1 and 3, to distances between a center of the coordinate frame of the camera and the center of the coordinate frame of the wrist (21);

for natural number l between 4 and 6, to angles representative of an orientation of the coordinate frame of the camera in the coordinate frame of the wrist.

The second matrix is expressed in the form $$T_k^{PG\to BF} == \prod_{i=1}^{i=6} \begin{bmatrix} \cos(J_i^k+\theta_i+\Delta\theta_i) & -\sin(J_i^k+\theta_i+\Delta\theta_i) & 0 & l_i+\Delta l_i \\ \sin(J_i^k+\theta_i+\Delta\theta_i)\times\cos(\alpha_i+\Delta\alpha_i) & \cos(J_i^k+\theta_i+\Delta\theta_i)\times\cos(\alpha_i+\Delta\alpha_i) & -\sin(\alpha_i+\Delta\alpha_i) & -(r_i+\Delta r_i)\times\sin(\alpha_i+\Delta\alpha_i) \\ \sin(J_i^k+\theta_i+\Delta\,\theta_i)\times\sin(\alpha_i+\Delta\alpha_i) & \cos(J_i^k+\theta_i+\Delta\theta_i)\times\sin(\alpha_i+\Delta\alpha_i) & \cos(\alpha_i+\Delta\alpha_i) & -(r_i+\Delta r_i)\times\cos(\alpha_i+\Delta\alpha_i) \\ 0 & 0 & 0 & 1 \end{bmatrix}$$

where

The quantities $$J_i^k$$

are angles measured on the axis $A_i$ of the multi-axis robot, for the k-th point aimed at by the camera during steps a) and d);

the quantities $\alpha_i$, $\iota_i$, $\theta_i$ and $r_i$ are the Denavit-Hartenberg theoretical parameters modified for the axis $A_i$ of the multi-axis robot; and the quantities $\Delta\alpha_i$, $\Delta\iota_i$, $\Delta\theta_i$ and $\Delta r_i$ are variables for the coefficients of the second change matrix, determined by minimizing the overall value calculated during step g).

The minimization of the overall difference value is performed by the least squares method with solving a system of six equations with six unknowns when determining the coefficient variables of the first change matrix and solving a system of twenty-four equations with twenty-four unknowns when determining the coefficient variables of the second change matrix, in the case of a method as described hereinabove, or solving a system of thirty equations with thirty unknowns when determining the coefficient variables of the first and second change matrices, in the case of another method as described hereinabove.

According to a second aspect, the invention relates to the application of a method as mentioned hereinabove for adjusting the geometrical model of a robot for applying a coating product equipped with a printing head or a coating product sprayer.

According to a third aspect, the invention relates to a robot equipped with a tool, a camera and an electronic control unit programmed to automatically implement a method as mentioned hereinabove.

BRIEF DESCRIPTION OF THE DRAWINGS

The invention will be better understood and other advantages thereof will appear more clearly in the light of the following description, given only as an example and made with reference to the enclosed drawings.

DETAILED DESCRIPTION

Figure 1:
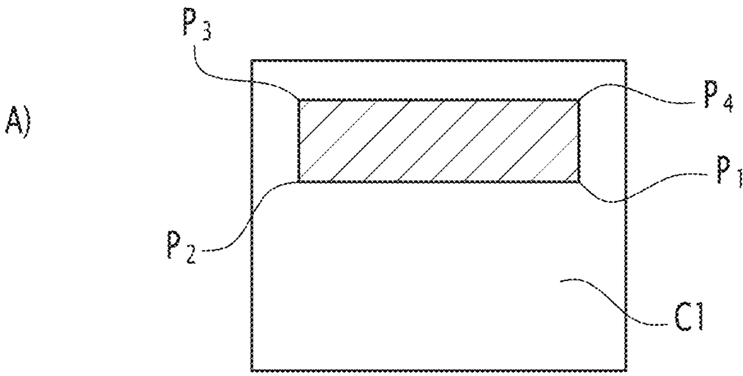
FIG. 1 is a schematic representation of principle, on three inserts A), B) and C), of a target used in the method of the invention.
Figure 1:
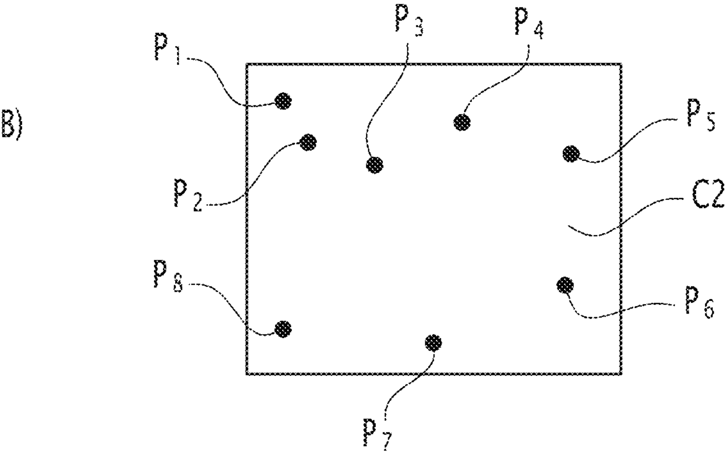
Figure 1:
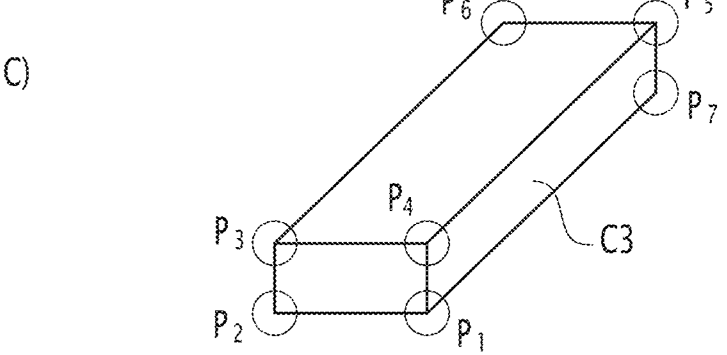
Figure 2:
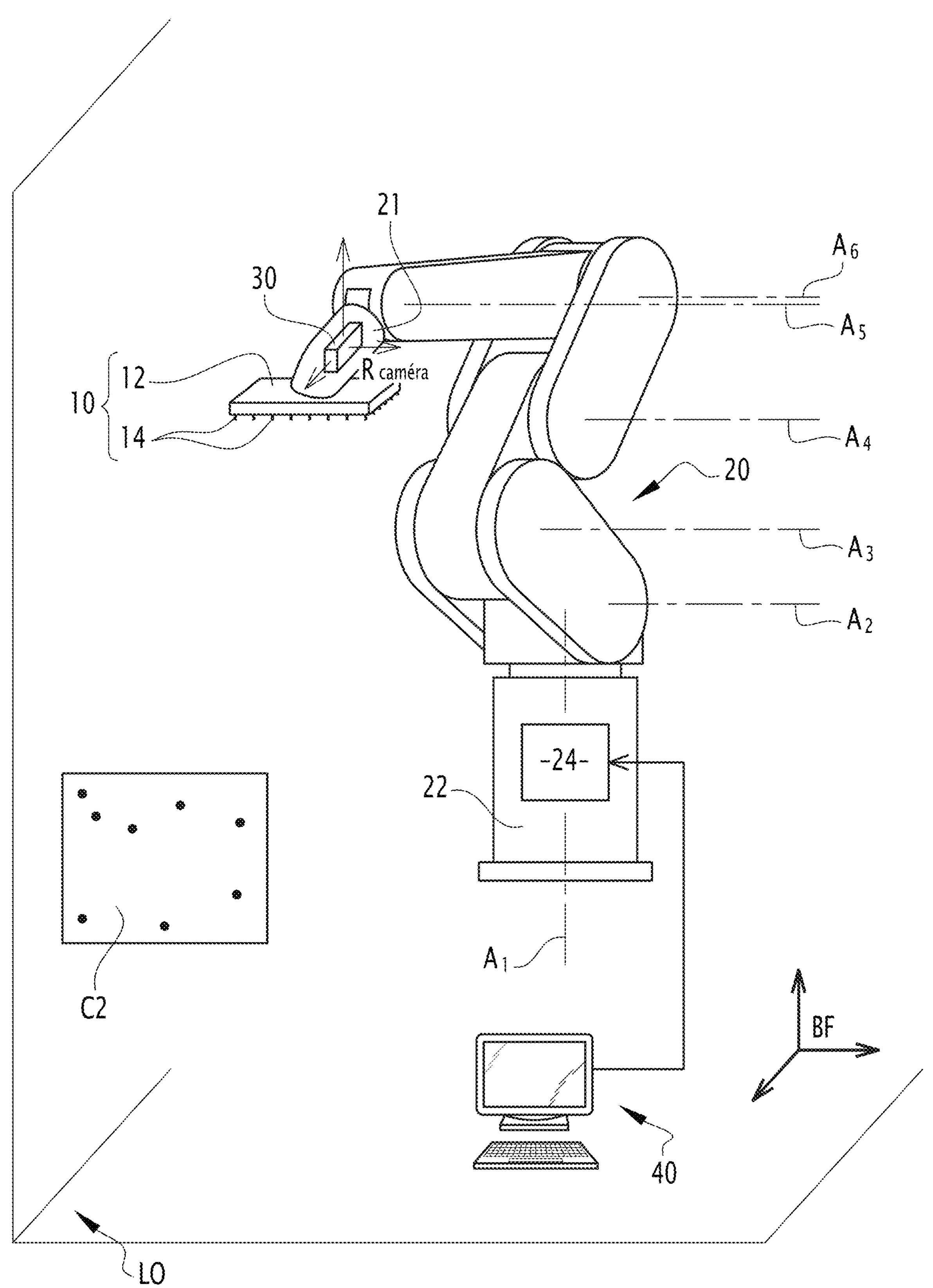
FIG. 2 is a schematic representation of the principle of a multi-axis robot according to the invention, during use with the target shown in insert B) of FIG. 1.

FIG. 1 shows, on three inserts A), B) and C), three targets C1, C2 and C3 which can be used to implement the method of the invention, with the multi-axis robot 20 shown in FIG. 2.

Each of the targets C1, C2 and C3 comprises a certain number of remarkable points $P_1$ to $P_4$ for the target C1, $P_1$ to $P_8$ for the target C2, $P_1$ to $P_7$ for the target C3.

"L" denotes the number of remarkable points of a target, the number L being equal to 8 in the example of FIG. 2. "ι" denotes the order number of a remarkable point $P_\iota$ of the target; with ι a natural number comprised between 1 and L.

The examples of targets shown in FIG. 1 are not limiting and any form of target can be envisaged, provided that same makes it possible to locate at least two remarkable points $P_\iota$. The remarkable points $P_\iota$ may be the angles of a geometrical figure or spots drawn on a two-dimensional plate, as shown on inserts A) and B) or the angles of a three-dimensional structure, as shown on insert C) of FIG. 1. In general, a remarkable point $P_\iota$ is a point of a target that can be spotted by a camera, in particular because the point contrasts with the environment thereof.

As a non-limiting example, FIG. 2 shows the use of target C2 with the multi-axis robot 20.

The multi-axis robot 20 comprises an arm formed of sections articulated together about six axes $A_1$ to $A_6$, as well as a wrist 21 which forms the distal end of the arm. According to a variant of the invention (not shown), the wrist can be articulated with respect to the end of the arm of the multi-axis robot 20, about a seventh axis.

A print head 10, comprising a body 12 equipped with nozzles 14, is mounted on the wrist 21. Same is intended to apply a coating product, such as a paint or a varnish, to objects not shown, e.g. motor vehicle bodies.

The six axes of articulation $A_1$ to $A_6$ make it possible to deform the arm of the multi-axis robot 20 in order to move the print head 10 in space, opposite the surfaces of the objects to be coated.

A camera 30 is mounted on the wrist 21, being fastened thereto by appropriate mechanical means, e.g. screws or clipping members. The attachment of the camera 30 to the wrist 21 has to be strong enough to withstand the accelerations undergone by the camera while the robot is moving.

Advantageously, the camera is a CCD camera or a laser camera with one or two cameras, of the binocular and/or profilometer type.

A problem that arises with a multi-axis robot of the type shown in FIG. 2 is to know the position of the camera 30, in a fixed base coordinate frame BF, linked to a room LO wherein the multi-axis robot 20 is arranged. In fact, a correct positioning of the camera 30 in the LO room is necessary to precisely identify the location of the objects aimed at by the camera.

The position of the camera in the room LO depends on the actual positioning of the camera 30 with respect to the wrist 21 of the robot and on the actual positioning of the wrist in the room LO.

The positioning of the camera 30 with respect to the wrist 21 can, in a first analysis, be approximated by assuming that the camera is immobilized on the wrist in a theoretical position corresponding to an assembly plan. The positioning of the wrist 21 in the room LO can, also in a first analysis, be approximated by using a theoretical model of the geometry of the multi-axis robot 20, in particular based on modified Denavit-Hartenberg parameters or DHM.

However, the approximations mentioned hereinabove lead to positioning errors, which can induce defects in the application of coating product by means of the print head 10, if the print head is not correctly positioned and oriented with respect to a surface being coated.

The method of the invention aims to reduce or even eliminate positioning errors. It is implemented iteratively, until the value of a function representative of a positioning error between remarkable points $P_\iota$ observed on a target such as target C2 is reduced.

The model adjustment method of the invention is implemented in a calculator 40 which is represented in FIG. 2 in the form of a computer and which communicates with a controller 24 of the multi-axis robot 20 arranged in a base 22 of the robot. The calculator 40 is programmed for automatically implementing the method of the invention. The controller 24 and the calculator 40 together form an electronic control unit for the multi-axis robot 20. In a variant, the parts 24 and 40 of the control unit are a single physical entity, which can be integrated into the base 22.

$R_{camera}$ denotes a coordinate frame linked to the camera and $R_{PG}$ denotes a coordinate frame linked to the wrist 21.

The method of the invention provides for recording the position of at least remarkable points $P_\iota$ of the target C2 by bringing the camera successively into two distinct image taking locations in the room LO where the multi-axis robot 20 is located, i.e. in two distinct locations with respect to a base coordinate frame BF fixed with respect to the room LO.

L denotes the number of remarkable points $P_\iota$ of the target C2, the number L being a natural integer greater than or equal to 2, preferably greater than or equal to 3.

The number of the location of the camera is denoted k with k equal to 1 or 2 when locating a remarkable point $P_\iota$.

A location is defined by a location where the camera is located and an orientation of the camera during an image taking, i.e. during the identification of a remarkable point. A image taking location may also be called an image taking position or an aiming location.

For each image taking location k and each remarkable point $P_\iota$, the coordinates of the point in the coordinate frame $R_{camera}$ are expressed in the form of a vector comprising an abscissa, an ordinate and a height of the point in the coordinate frame. The vector $$V_{k,l}^{Camera}$$

is noted, expressing the coordinates of a remarkable point $P_\iota$ for the location k, expressed in the coordinate frame camera $R_{camera}$.

In a variant, the number of distinct image taking locations used is greater than or equal to three.

For the remainder of the present description, k1 and k2 are used to identify two distinct locations of the camera among the K locations that the camera can take to aim at the points $P_\iota$ of the target while being moved by the wrist 21, with K a natural number greater than or equal to 2, preferably greater than or equal to 3.

The product of the numbers L and K minus 6, i.e. L*K−6, is greater than or equal to the number of variables of the geometrical model of the robot.

Thus, the position of a remarkable point $P_\iota$ in the camera coordinate frame can be expressed in the form $$V_{k1,l}^{Camera}$$

when the camera is in the first location k1 and in the form $$V_{k2,l}^{Camera}$$

when the camera is in the second location k2.

Said positions of the remarkable points $P_\iota$ can also be expressed in the coordinate frame $R_{PG}$ linked to the wrist in the form $$T^{Camera \to PG} \cdot V_{k1,l}^{Camera} \quad \text{(equation 1)}$$

$$T^{Camera \to PG} \cdot V_{k2,l}^{Camera} \quad \text{(equation 2)}$$

where $T^{Camera \to PG}$ is a first matrix for changing from the coordinate frame $R_{camera}$ linked to the camera 30 to the coordinate frame $R_{PG}$ linked to the wrist 21.

The first change matrix can be expressed in the form $$T^{Camera \to PG} = \begin{bmatrix} \cos(X_5)\cdot\cos(X_6) & \sin(X_4)\cdot\sin(X_5)\cdot\cos(X_6) - \cos(X_4)\cdot\sin(X_6) & \cos(X_4)\cdot\sin(X_5)\cdot\cos(X_6) + \sin(X_4)\cdot\sin(X_6) & X_1 \\ \cos(X_5)\cdot\sin(X_6) & \sin(X_4)\cdot\sin(X_5)\cdot\sin(X_6) + \cos(X_4)\cdot\cos(X_6) & \cos(X_4)\cdot\sin(X_5)\cdot\sin(X_6) - \sin(X_4)\cdot\cos(X_6) & X_2 \\ -\sin(X_5) & \sin(X_4)\cdot\cos(X_5) & \cos(X_4)\cdot\cos(X_5) & X_3 \\ 0 & 0 & 0 & 1 \end{bmatrix} \quad \text{(equation 3)}$$

where the sixteen coefficients of the first change matrix $T^{Camera \to PG}$ are expressed as a function of six variables $X_1$ to $X_6$.

The variables $X_1$, $X_2$, $X_3$ corresponding to a translation of the center of the coordinate frame $R_{camera}$ linked to the camera with respect to the center of the coordinate frame $R_{PG}$ linked to the wrist 21, while the variables $X_4$, $X_5$ and $X_6$ correspond to rotation angles of the axes of the two coordinate frames with respect to one another. In the case of the matrix presented in equation 3, thereof are the angles of the roll-pitch-yaw convention. Another representation of the angles can be used.

The position of the remarkable points $P_\iota$ is not known in the base coordinate frame BF but can be expressed in said coordinate frame, for each image taking location k, as a function of the position thereof in the coordinate frame $R_{PG}$ linked to the wrist 21 by applying to the position a second change matrix for changing from the coordinate frame of the wrist to the base coordinate frame.

$T^{PG \to BF}$ or $$T_k^{PG \to BF}$$

refers to the second change matrix. Same is defined for each image taking location k of the camera, hence of the wrist 21.

In practice, the position of the coordinate frame of the wrist in the base coordinate frame depends on the image taking location wherein the camera 30 is located. The coordinate frame linked to the wrist when the camera is in the image taking location k can thus be expressed in the form $$R_{PG,k}^{BF}.$$

Therefore, there is, for each image taking location k, a change matrix for changing from the coordinate frame $$R_{PG,k}^{BF}$$

linked to the wrist to the base coordinate frame BF. The change matrix is denoted $$T_{k1}^{PG \to BF}$$

for the first image taking location and $$T_{k2}^{PG \to BF}$$

for the second image taking location.

Figure 3:
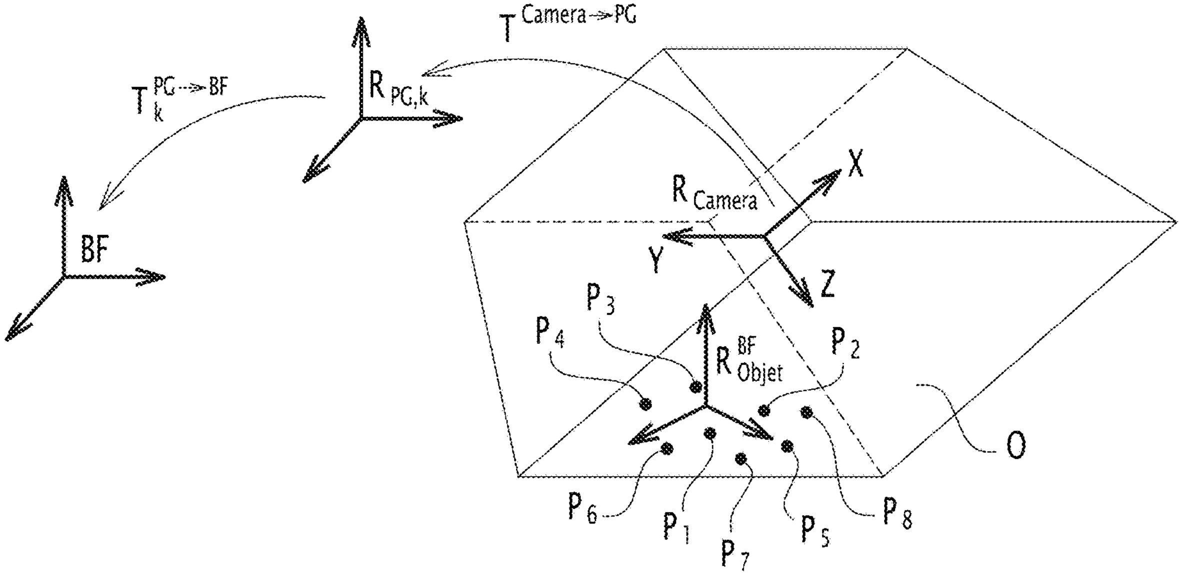
FIG. 3 is a schematic representation of principle of different coordinate frames and change matrices used in the method of the invention.

Thereby, as shown in FIG. 3, the position of a remarkable point $P_\iota$ identified in the camera coordinate frame is expressed in the wrist coordinate frame using the first change matrix $T^{Caméra \to PG}$ and is expressed, for each location k1 and k2 in the base coordinate frame BF using the second change matrix $$T_k^{PG \to BF},$$

with k equal to k1 or k2.

Advantageously, the second change matrix $$T_k^{PG \to BF}$$

is expressed using modified Denavit-Hartenberg parameters, also called DHM, as well as associated corrections, which serves to model the robot from the base 22 thereof to the wrist 21 thereof.

The modified Denavit-Hartenberg parameters are known per se. Same are also sometimes called Khalil-Kleinfinger parameters.

For example, the modified Denavit-Hartenberg parameters can be expressed, for each axis of rotation $A_i$ of the multi-axis robot 20 as:

$\alpha_i$: Theoretical angle between the axes $A_{i-1}$ and $A_i$ obtained by rotation about the axis $X_{i-1}$ of the coordinate frame associated with the axis $A_{i-1}$ $\iota_i$: Theoretical distance between the axes $A_{i-1}$ and $A_i$ obtained along the axis $X_{i-1}$ $\theta_i$: Theoretical angle between the axes $X_{i-1}$ and $X_i$ obtained by rotation about the axis $A_i$ $r_i$: Theoretical distance between the axis $X_{i-1}$ and $X_i$ obtained along the axis $A_i$ The following differences are also defined:

$\Delta\alpha_i$: Angle variation $\alpha_i$ $\Delta\iota_i$: Distance variation $\iota_i$ $\Delta\theta_i$: Angle variation $\theta_i$ $\Delta r_i$: Distance variation $r_i$ Under such conditions, the second change matrix which serves to change from a point of the coordinate frame $R_{PG}$ linked to the wrist to the base coordinate frame, can be expressed in the form (equation 4)

$$T_k^{PG\to BF} = \left[PG_{s,w}^k\right] = \prod_{i=1}^{i=6}\begin{bmatrix} \cos\left(J_i^k+\theta_i+\Delta\theta_i\right) & -\sin\left(J_i^k+\theta_i+\Delta\theta_i\right) & 0 & l_i+\Delta l_i \\ \sin\left(J_i^k+\theta_i+\Delta\theta_i\right)\times\cos(\alpha_i+\Delta\alpha_i) & \cos\left(J_i^k+\theta_i+\Delta\theta_i\right)\times\cos(\alpha_i+\Delta\alpha_i) & -\sin(\alpha_i+\Delta\alpha_i) & -(r_i+\Delta r_i)\times\sin(\alpha_i+\Delta\alpha_i) \\ \sin\left(J_i^k+\theta_i+\Delta\theta_i\right)\times\sin(\alpha_i+\Delta\alpha_i) & \cos\left(J_i^k+\theta_i+\Delta\theta_i\right)\times\sin(\alpha_i+\Delta\alpha_i) & \cos(\alpha_i+\Delta\alpha_i) & -(r_i+\Delta r_i)\times\cos(\alpha_i+\Delta\alpha_i) \\ 0 & 0 & 0 & 1 \end{bmatrix}$$

The expression is valid at each image taking location k, with k equal to k1 or k2.

$$J_i^k$$

represents the value of an angle of rotation of two parts of the multi-axis robot articulated about an axis $A_i$ when the multi-axis robot 20 is in the image taking location k.

The coefficients $$PG_{s,w}^k$$

of the second change matrix, where s and w are natural numbers comprised between 1 and 4, can be expressed as follows:

$$PG_{s,w}^k\text{: rotation matrix for } s\in\{1,2,3\}\ w\in\{1,2,3\}$$

$$PG_{s,4}^k\text{: rotation matrix for } s\in\{1,2,3\}$$

$$PG_{4,4}^k = 0 \text{ for } w\in\{1,2,3\}$$

$$PG_{4,4}^k = 1$$

The modified Denavit-Hartenberg parameters $\alpha_i$, $\iota_i$, $\theta_i$ and $r_i$ are the theoretical values of the robot, whereas the quantities $\Delta\alpha_i$, $\Delta\iota_i$, $\Delta\theta_i$ and $\Delta r_i$ are variables for the coefficients $$PG_{s,w}^k$$

of the second change matrix $$T_k^{PG\to BF}.$$

The geometrical model of the multi-axis robot 20 equipped with the camera 30 is denoted by Mod.

Figure 4:
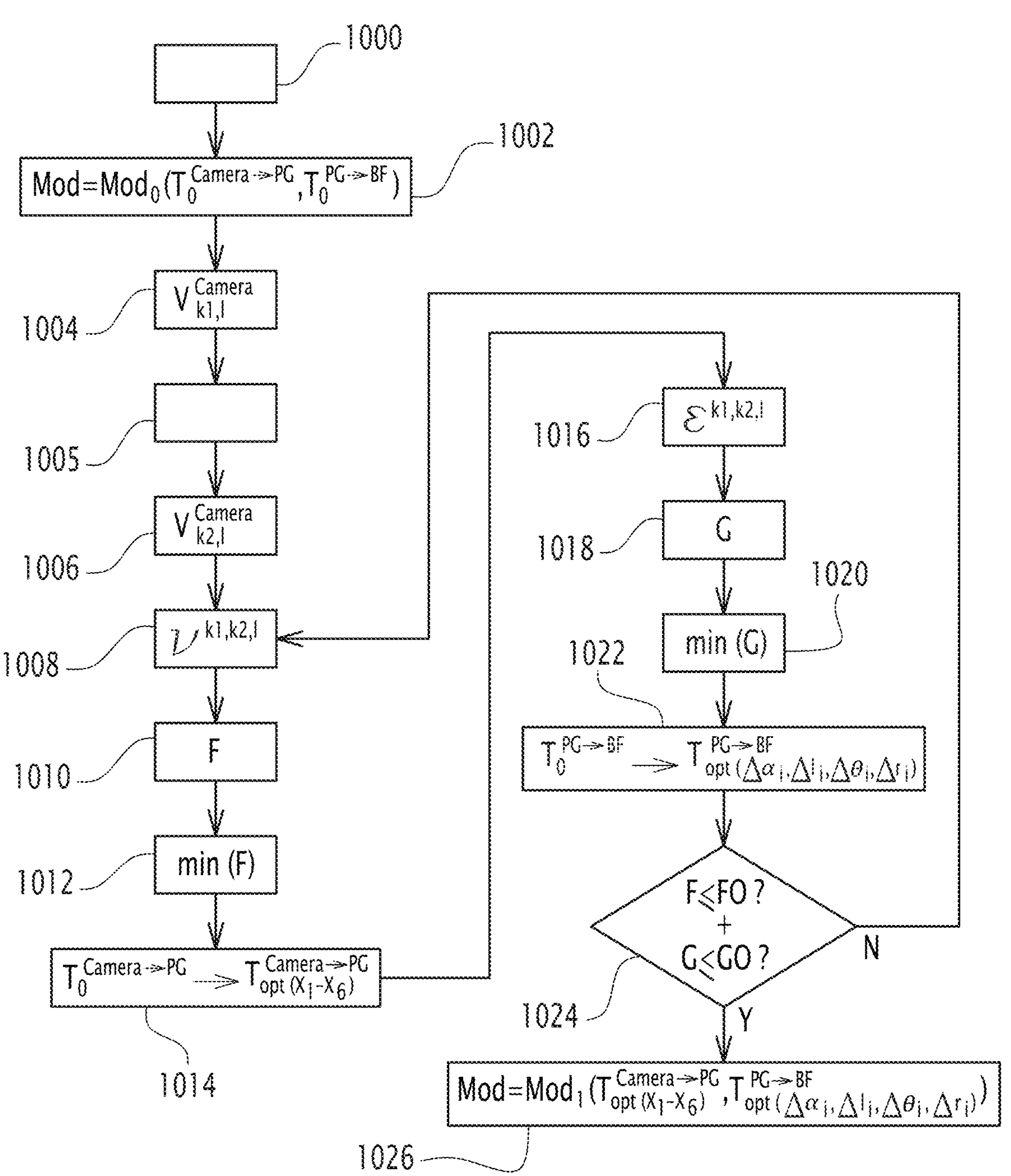
FIG. 4 is a block diagram of a method according to a first embodiment of the invention.

As can be seen in FIG. 4, the method of fitting the geometrical model Mod comprises a first initialization step 1000 wherein the calculator 40 is started.

During a step 1002, the geometrical model Mod is defined as an initial model $Mod_0$ which is as such defined by a first initial transfer matrix $$T_0^{Camera\to PG}$$

and by a second initial transfer matrix $$T_0^{PG\to BF}.$$

The first initial transfer matrix $$T_0^{Camera\to PG}$$

can be constructed by computation from the theoretical position of the camera 30 with respect to the wrist 21. The second initial transfer matrix $$T_0^{PG\to BF}.$$

can be constructed from a theoretical geometrical model of the multi-axis robot 20.

The initial model $Mod_0$ is used in the first part of the method, between steps 1004 and 1012 defined hereinafter.

In a following step 1004, the robot is brought into the first image taking location k1 where the camera 30 aims at the remarkable points $P_\iota$ and marks same in the frame $R_{camera}$ linked to the camera. In the step 1004, for each point $P_\iota$, the coordinates thereof are expressed in the frame $R_{camera}$ in the form $$V_{k1,l}^{Camera}$$

Then, in a step 1005, the camera 30 is moved to the second image taking location.

When the camera is in the second image taking location k2, during a step 1006 which follows step 1005, each remarkable point Pt is aimed at by the camera, and thus identified, and the coordinates thereof are expressed in the frame $R_{camera}$ linked to the camera in the form $$V_{k2,l}^{Camera}$$

In practice, each point $P_\iota$ keeps the same position, whether it is located by the camera from the image taking location k1 thereof or whether it is located by the camera from the image taking location k2 thereof.

Thereby, the position of each remarkable point $P_\iota$ in the base coordinate frame BF is not known but it is known that same is independent of the way in which the position is observed by the camera.

For each remarkable point $P_\iota$, a difference is defined $v^{k1,k2,\iota}$ between the positions thereof expressed in the base coordinate frame BF on the basis of the identification performed in the first image taking location k1 and the identification performed in the second image taking location, in the form $$v^{k1,k2,l} = T_{k1}^{PG\to BF}\cdot T^{Camera\to PG}\cdot V_{k1,l}^{Camera} - T_{k2}^{PG\to BF}\cdot T^{Camera\to PG}\cdot V_{k2,l}^{Camera} \quad \text{(equation 5)}$$

$v^{k1,k2,\iota}$ is thus the difference of the coordinates of a remarkable point $P_\iota$ expressed in the base coordinate frame BF, from the coordinates thereof detected by the camera 30 in the coordinate frame $R_{camera}$ linked to the camera, from the first image taking location k1 and from the second image taking location k2.

Such difference is calculated by the calculator 40, for each remarkable point $P_\iota$, during a step 1008 of the method which follows steps 1006 and 1008.

Theoretically, such difference should be equal to zero, since the remarkable points are fixed in the base coordinate frame BF.

In practice, if the difference is non-zero, it can be assumed that the coefficients of the first initial change matrix $$T_0^{Camera\to PG}$$

are not exactly representative of the real position of the camera 30 with respect to the wrist 21, in particular because of the manufacturing tolerances of the components and of the adjustments made when the parts are mounted on one another.

In a subsequent step 1010, an error function F is defined as the sum of the squares and the differences determined during step 1008, in the form $$F = \sum_{l=1}^{L}\sum_{k1=1}^{K}\sum_{k2=k1+1}^{K}\left\|v^{k1,k2,l}\right\|^2 \quad \text{(equation 6)}$$

The value of the error function F is an overall value of difference between the coordinates of the remarkable points $P_\iota$ determined from the two image taking locations.

During a step 1012, also implemented by the calculator 40, the function F is minimized by playing with the variables $X_1$ to $X_6$ of the first change matrix $T^{Camera\to PG}$.

The optimization is performed by solving a system of six nonlinear equations, e.g. by the least squares method. The system of equations has six unknowns, namely the variables $X_1$ to $X_6$.

In a variant, the solution of the system of nonlinear equations is performed using the Levenberg-Marquardt method or another method.

In a following step 1014, the first change matrix $$T_0^{Camera\to PG}$$

is updated in the form of an optimized version of the first change matrix $$T_{opt(X1-X6)}^{Camera\to PG},$$

the coefficients of which integrate the variables $X_1$ to $X_6$ determined during step 1012 and integrated into the model Mod instead of the first initial change matrix $$T_O^{Camera\to PG}$$

In other words, starting from step 1014, the computations performed by the calculator 40 take account of an optimized version of the first change matrix, namely $$T_{opt(X1-X6)}^{Camera\to PG},$$

In a following step 1016, a second difference $\varepsilon^{k1,k2,\iota}$ is calculated between the coordinates of the remarkable points $P_\iota$ in the form $$\varepsilon^{k1,k2,l} = T_{k1}^{PG\to BF}\cdot T_{opt}^{Camera\to PG}\cdot V_{k1,l}^{Camera} - T_{k2}^{PG\to BF}\cdot T_{opt}^{Camera\to PG}\cdot V_{k2,l}^{Camera} \quad \text{(equation 7)}$$

Theoretically, the difference should also be zero.

In practice, if the difference is non-zero, and greater than the precision of the robot's repeatability, it can be assumed that the coefficients of the second initial change matrix $$T_0^{PG\to BF}$$

are not exactly representative of the structure and operation of the multi-axis robot 20, in particular because of manufacturing tolerances and the wear of the articulations thereof.

In a subsequent step 1018, an error function G is defined as the sum of the squares and differences determined during step 1016, in the form:

$$G = \sum_{l=1}^{L}\sum_{k1=1}^{K}\sum_{k2=k1+1}^{K}\left\|\varepsilon^{k1,k2,l}\right\|^2 \quad \text{(equation 8)}$$

The value of the error function G is another overall value of difference between the coordinates of the remarkable points $P_\iota$ determined from the two image taking locations.

During a step 1020, also implemented by the calculator 40, the function G is minimized by playing with the variables $\Delta\alpha_i$, $\Delta\iota_i$, $\Delta\theta_i$ and Ara of the second change matrix $$T_k^{PG\rightarrow BF},$$

for each image taking location.

The optimization is performed by solving a system of twenty-four nonlinear equations, e.g. by the least squares method. The system of equations has twenty-four unknowns, namely the four variables $\Delta\alpha_i$, $\Delta\iota_i$, $\Delta\theta_i$ and $\Delta r_i$, for each axis $A_i$, with i a natural number between 1 and 6.

When the number K of locations to which the camera is successively brought is greater than or equal to 3, steps 1005, 1006 and the step of determining the coordinates of each point in the frame $R_{Caméra}$ linked to the camera are repeated as many times as necessary, the number k being able to take the value 3, 4, 5, or more.

In a variant, the solution of the system of nonlinear equations is performed using the Levenberg-Marquardt method or another method.

Solving the system of 24 equations with 24 unknowns creates a second optimized change matrix $$T_{opt(\Delta\alpha_i,\Delta l_i,\Delta\theta_i,\Delta r_i)}^{PG\rightarrow BF}$$

In a following step 1022, the optimized version of the second change matrix T $$T_{opt(\Delta\alpha_i,\Delta l_i,\Delta\theta_i,\Delta r_i)}^{PG\rightarrow BF},$$

the coefficients of which integrate the variables $\Delta\alpha_i$, $\Delta\iota_i$, $\Delta\theta_i$ and $\Delta r_i$ determined during step 1020, is integrated into the model Mod instead of the first initial change matrix $$T_0^{PG\rightarrow BF}$$

The method of the invention comprises a step 1024, implemented after steps 1014 and 1022, of calculating the differences $v^{k1,k2,\iota}$, $\varepsilon^{k1,k2,\iota}$ using the model Mod which integrates the first and second optimized matrices, i.e. updated with the last variables $X_1$-$X_6$.$\Delta\alpha_i$, $\Delta\iota_i$, $\Delta\theta_i$, and $\Delta r_i$ determined during steps 1012 and 1020. Step 1024 also consists in calculating the overall difference values from the error functions F and G and in comparing the overall difference values with two threshold values F0 and G0.

If the overall difference values of the functions F and G are less than or equal to the threshold values F0 and G0, then it is considered that the model Mod is correctly adjusted and the new geometrical model of the multi-axis robot 20 equipped with the camera 30 is confirmed, i.e. frozen, in a step 1026 on the basis of the first and second change matrices defined in the last implemented steps 1014 and 1022.

In the opposite case, the following steps 1008 and following are implemented again, on the basis of the first and second change matrices already partially optimized, defined in the last implemented steps 1014 and 1022.

Steps 1008 to 1024 are then repeated by iteration, until values of the error functions F and G are obtained which are lower than the threshold values F0 and G0.

Figure 5:
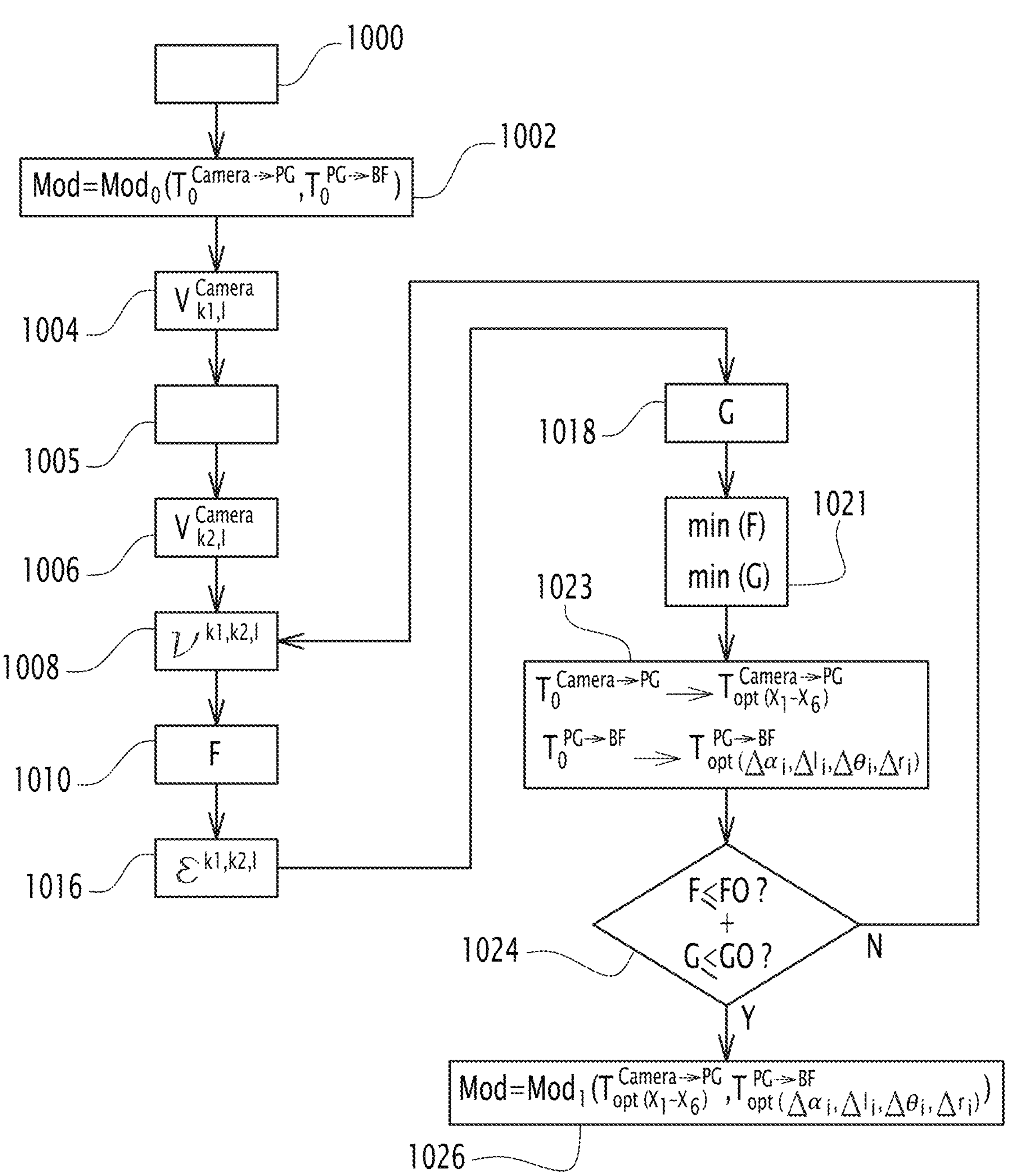
FIG. 5 is a block diagram similar to FIG. 4, for a method according to a second embodiment of the invention.

In the second embodiment of the invention shown in FIG. 5, elements analog to the elements of the first embodiment have the same reference and are not described in detail.

Steps 1000 to 1008 of the second method are identical to steps 1000 to 1008 of the first method.

The method of the second embodiment differs from the method of the first embodiment in that the first change matrix is not optimized by searching for a minimum of the function F considered alone. Steps 1016 and 1018 follow step 1012 directly.

The error functions F and G are calculated in the form of a single overall value which is minimized in the same step 1021, which consists in solving a system of thirty non-linear equations with thirty unknowns, namely the variables $X_1$ to $X_6$, $\Delta\alpha_i$, $\Delta\iota_i$, $\Delta\theta_i$ and $\Delta\eta$, with i a natural number between 1 and 6.

As for steps 1014 and 1020 of the first method in FIG. 4, the solution of the system of equations can be done by the least squares method, the Levenberg-Marquardt method, or another method.

Then, a step 1023 corresponding to the combination of steps 1014 and 1022 of the method of FIG. 4 is implemented, before a comparison step 1024 is performed, with the same operation as for the first method.

When the values of the two functions F and G are less than or equal to the two threshold values F0 and G0, the model is considered as adjusted and the new geometrical model of the multi-axis robot 20 equipped with the camera 30 is confirmed, i.e. frozen, in a step 1026 on the basis of the first and second change matrices defined in the last implement step 1023.

In the opposite case, the steps 1008 and the following steps are implemented again, on the basis of the first and second change matrices already partially optimized, defined in the last implemented step 1023.

The method can be implemented provided that at least two remarkable points $P_\iota$ are targeted and identified during steps 1004 and 1006. In other words, the number of remarkable points used is greater than or equal to two. Same is not necessarily equal to the number of remarkable points of the target.

When more than two image taking locations are used to determine the position of the remarkable points, the definition of differences and errors is adapted.

In a variant, at least one of the error functions F and G is constructed without using the square of the individual differences $v^{k1,k2,\iota}$ or $\varepsilon^{k1,k2,\iota}$. The functions may be equal e.g. to the sum of the absolute values of the differences or to another value calculated from the differences.

In a variant of the invention (not shown), the multi-axis robot 20 may be equipped with an application member other than a print head, e.g. a pneumatic or rotary coating product sprayer, possibly of the electrostatic type.

According to another variant, the multi-axis robot 20 may be equipped with a tool other than a member for applying a coating product, e.g. a machining tool, a welding tool or a gripping tool.

Any feature described in the foregoing for one embodiment or one variant, can be implemented for the other embodiments and variants described hereinabove, provided that is technically feasible.

The invention claimed is:

1. A method for adjusting a geometrical model of a multi-axis robot arranged in a room and equipped with a camera, this model comprising a first matrix, for changing between a coordinate frame linked to the camera and a coordinate frame linked to a wrist of the robot, and a second matrix linked to the room, characterized in that the method comprises at least the following steps:

a) aiming, with the camera arranged in a first image taking location in the room, at least two points among L remarkable points of a fixed target in the base coordinate frame, with L an integer number greater than or equal to 2;

b) determining the coordinates of each point referred to during step a) in the coordinate frame linked to the camera which is in the first image taking location;

c) moving the camera to a second image taking location in the room that is different from the first image taking location;

d) aiming, with the camera arranged in the second image taking location, at the points of the fixed target, already aimed at during step a); and e) determining the coordinates of each point referred to during step d) in the coordinate frame linked to the camera which is in the second position;

wherein the camera is successively moved in K locations, with K being an integer number greater than or equal to 2; and wherein the method further includes at least the following steps:

f) calculating, for each point aimed at by the camera during steps a) and d), a difference between the coordinates of the point in the base coordinate frame, expressed as a function of the coordinates determined during steps b) and e) using the first and second change matrices; and g) calculating at least one overall difference value by means of a function having as a variable a difference calculated during step f);

wherein variables of coefficients of the first change matrix and variables of coefficients of the second change matrix are determined by minimizing the overall value calculated during step g); and wherein the product of the integer numbers L and K minus 6 is greater than or equal to the number of variables of the geometrical model of the multi-axis robot.

2. The method of claim 1, wherein a first overall difference value is calculated during step g), and furthering comprising the following steps subsequent to step g):

h) determining the variables of the coefficients of the first change matrix minimizing the first overall value calculated during step g);

i) updating the first change matrix with coefficients that integrate the variables determined during step h);

j) calculating, for each point targeted by the camera during steps a) and d), a difference between the coordinates of the point in the base coordinate frame, expressed in terms of the coordinates determined during steps b) and e) using the first change matrix updated during step i);

k) calculating a second overall difference value using a function with the differences calculated during step i) as a variable;

l) determining the variables of the coefficients of the second change matrix by minimizing the second overall value calculated during step j); and m) updating the second change matrix with coefficients that integrate the variables determined during step i).

3. The method of claim 2 further comprising the following steps subsequent to step h):

n) calculating, for each point aimed at by the camera during steps a) and d), a difference between the coordinates of said point in the base coordinate frame, expressed as a function of the coordinates determined during steps b) and e) by using the first change matrix) updated with the last variables of coefficients determined for the first matrix and the second change matrix) updated with the last variables of coefficients determined for this second matrix);

o) calculating an overall difference value using a function with the differences calculated during step n) as a variable;

p) comparing the overall value calculated during step o) with a threshold value;

q) if the comparison during step p) shows that the overall value calculated during step o) is greater than the threshold value, then using again steps f) and following; and r) if the comparison during step p) shows that the overall value calculated during step o) is lower than the threshold value, freezing the first and second change matrices with the last variables determined to use same in the geometrical model of the multi-axis robot.

4. The method of claim 1 further comprising the following step subsequent to step g):

h') determining the variables of the coefficients of the first matrix and the variables of the coefficients of the second matrix determined, minimizing a single overall value calculated during step g).

5. The method of claim 4 further comprising the following steps subsequent to step h'):

s) calculating, for each point aimed at by the camera during steps a) and d), a difference between the coordinates of said point in the base coordinate frame, expressed as a function of the coordinates determined during steps b) and e) by using the first change matrix updated with the last variables of coefficients determined for the first matrix and the second change matrix) updated with the last variables of coefficients determined for this second matrix);

t) calculating an overall difference value using a function with the differences calculated during step n) as a variable;

u) comparing the overall value calculated during step o) with a threshold value;

v) if the comparison during step p) shows that the overall value calculated during step o) is greater than the threshold value, then using again steps f) and following; and w) if the comparison during step p) shows that the overall value calculated during step o) is lower than the threshold value, freezing the first and second change matrices with the last variables determined to use same in the geometrical model of the multi-axis robot.

6. The method of claim 1, wherein the difference calculated during step f), j) or n) is expressed in the form $$v^{k1,k2,l} = T_{k1}^{PG\to BF} \cdot T^{Camera\to PG} \cdot V_{k1,l}^{Camera} - T_{k2}^{PG\to BF} \cdot T^{Camera\to PG} . V_{k2,l}^{Camera}$$

wherein:

$v^{k1,k2,l}$ is the difference between the coordinates of the same point numbered l seen by the camera from the positions k1 and k2;

$$V_{k1,l}^{Camera}$$

is a vector representing the position of the point l seen by the camera from the position k1;

$$V_{k2,l}^{Camera}$$

is a vector representing the position of the point l seen by the camera from the position k2;

$T^{Caméra\to PG}$ is the first change matrix; and $$T_{k1}^{PG\to BF} \text{ or } T_{k2}^{PG\to BF}$$

is the second change matrix.

7. The method of claim 1, wherein the overall difference value calculated during step g), k) or o) is the sum of the squares of the difference values calculated during step f), i) or l) and is expressed in the form $$F = \sum_{l=1}^{L} \sum_{k1=1}^{K} \sum_{k2=k1+1}^{K} \left\| v^{k1,k2,l} \right\|^2$$

wherein:

$v^{k1,k2,l}$ is the difference between the coordinates of the same point numbered l seen by the camera from the locations k1 and k2;

l is the order number of one of the points aimed at by the camera during steps a) and d), comprised between 1 and L;

k1 is the order number of the first location, comprised between 1 and K;

k2 is the serial number of the second location, comprised between 1 and K; and

K is the number of locations the camera can take to aim at the points of the target.

8. The method of claim 1, wherein the first change matrix is expressed in the form $$\begin{bmatrix} \cos(X_5)\cdot\cos(X_6) & \sin(X_4)\cdot\sin(X_5)\cdot\cos(X_6) - \cos(X_4)\cdot\sin(X_6) & \cos(X_4)\cdot\sin(X_5)\cdot\cos(X_6) + \sin(X_4)\cdot\sin(X_6) & X_1 \\ \cos(X_5)\cdot\sin(X_6) & \sin(X_4)\cdot\sin(X_5)\cdot\sin(X_6) + \cos(X_4)\cdot\cos(X_6) & \cos(X_4)\cdot\sin(X_5)\cdot\sin(X_6) - \sin(X_4)\cdot\cos(X_6) & X_2 \\ -\sin(X_5) & \sin(X_4)\cdot\cos(X_5) & \cos(X_4)\cdot\cos(X_5) & X_3 \\ 0 & 0 & 0 & 1 \end{bmatrix} w$$

wherein the quantities Xi, for i natural number between 1 and 6, are the variables determined by minimizing the overall value calculated during step g) and correspond to the following:

for i natural number between 1 and 3, to distances between a center of the coordinate frame linked to the camera and the center of the coordinate frame linked to the wrist; and for i natural number between 4 and 6, to angles representative of an orientation of the coordinate frame of the camera in the coordinate frame of the wrist.

9. The method of claim 1, wherein the second matrix is expressed in the form $$T_k^{PG\to BF} == \prod_{i=1}^{i=6} \begin{bmatrix} \cos(J_i^k + \theta_i + \Delta\theta_i) & -\sin(J_i^k + \theta_i + \Delta\theta_i) & 0 & l_i + \Delta l_i \\ \sin(J_i^k + \theta_i + \Delta\theta_i)\times \cos(\alpha_i + \Delta\alpha_i) & \cos(J_i^k + \theta_i + \Delta\theta_i)\times \cos(\alpha_i + \Delta\alpha_i) & -\sin(\alpha_i + \Delta\alpha_i) & -(r_i + \Delta r_i)\times \sin(\alpha_i + \Delta\alpha_i) \\ \sin(J_i^k + \theta_i + \Delta\theta_i)\times \sin(\alpha_i + \Delta\alpha_i) & \cos(J_i^k + \theta_i + \Delta\theta_i)\times \sin(\alpha_i + \Delta\alpha_i) & \cos(\alpha_i + \Delta\alpha_i) & -(r_i + \Delta r_i)\times \cos(\alpha_i + \Delta\alpha_i) \\ 0 & 0 & 0 & 1 \end{bmatrix}$$

wherein:

the quantities $$J_i^k$$

are angles measured on the axis $A_i$ of the multi-axis robot, for the k-th point targeted by the camera during steps a) and d);

the quantities $\alpha_i$, $\iota_i$, $\theta_i$ and $r_i$ are the Denavit-Hartenberg theoretical parameters modified for the axis $A_i$ of the multi-axis robot; and the quantities are variables for the coefficients of the second change matrix, determined by minimizing the overall value calculated during step g).

10. The method of claim 2, wherein the overall difference value is minimized by the least squares method by solving a system of six equations with six unknowns when determining the coefficient variables of the first change matrix and solving a system of twenty-four equations with twenty-four unknowns when determining the coefficient variables of the second change matrix.

11. The method of claim 3, wherein the overall difference value is minimized by the least squares method by solving a system of thirty equations with thirty unknowns when determining the coefficient variables of the first and second change matrices.

12. The method of claim 1, wherein the multi-axis robot is a coating material application robot also equipped with a print head or a sprayer for a coating material.

13. A robot equipped with a tool, a camera, and an electronic control unit programmed to automatically implement the method of claim 1.

* * * * *